G. A. SPELTS, Jr
INTERNAL COMBUSTION ENGINE.
APPLICATION FILED DEC. 22, 1917.

1,396,976.

Patented Nov. 15, 1921.

Witnesses:
W. F. Kilroy
Harry R. L. White

Inventor:
George A. Spelts Jr.
By Barnett Truman
Atty.

UNITED STATES PATENT OFFICE.

GEORGE A. SPELTS, JR., OF ULYSSES, NEBRASKA, ASSIGNOR TO ULYSSES ENGINE COMPANY, OF ULYSSES, NEBRASKA, A CORPORATION OF NEBRASKA.

INTERNAL-COMBUSTION ENGINE.

1,396,976.  Specification of Letters Patent.  Patented Nov. 15, 1921.

Application filed December 22, 1917. Serial No. 208,356.

*To all whom it may concern:*

Be it known that I, GEORGE A. SPELTS, Jr., a citizen of the United States, residing at Ulysses, in the county of Butler and State of Nebraska, have invented certain new and useful Improvements in Internal-Combustion Engines, of which the following is a specification.

This invention relates to internal combustion engines, and particularly to internal combustion engines adapted to operate on the two cycle principle.

One of the objects of the invention is to provide an improved internal combustion engine of the two cycle type, in which the inlet and exhaust ports are arranged at opposite extremities of the compression and working strokes of the piston, and to provide a suitable fuel supply system which will coöperate with such an arrangement of ports, to introduce an explosive mixture into the working chamber under pressure so as to completely scavenge the spent products of combustion and to entirely fill the working chamber with a fresh charge of said mixture.

Another object is to provide, in combination with an engine of the above type, new and improved controlling mechanism whereby the pressure in the fuel vaporizing system may be automatically regulated so as to readily respond to the working requirements of the engine.

Another object is to provide an improved engine structure in which an explosive mixture of fuel and air is introduced into the working chamber under pressure, and to provide improved coöperating mechanism for varying the character of said mixture to suit the working conditions under which the engine is operated, and to economize in the energy required to produce the desired air pressure for said mixture.

In engines such as double acting engines having a port which is opened and closed by the movement of the piston, in substantially the same manner as illustrated in the accompanying drawings, the pistons are usually made much longer than would be required for a single acting engine. If these pistons are made hollow so as to provide the desired lightness, they are particularly susceptible to warping when subjected to a high degree of heat. It is therefore contemplated as one of the objects of this invention to provide a novel piston construction, suitable for use in connection with a double acting engine, which may be made light in weight and which will not warp when subjected to heat.

A further object of the invention is to provide novel and improved means providing a packing gland for the piston rod whereby the portion of the piston rod subjected to heat in the working chamber will not be subjected to a rubbing contact with the other elements of the packing gland.

The invention has for further objects the novel arrangements, constructions and combinations of parts and devices hereinafter more specifically described and claimed, for carrying out the above stated objects and such other objects as may appear from the following description.

The invention is illustrated in certain preferred embodiments in the accompanying drawings, wherein:

Fig. 18 is a further modification illustrating an arrangement suitable for using kerosene as a fuel.

Like characters of reference designate like parts in the several figures of the drawings.

In the drawings, the invention is illustrated in connection with a double acting two cycle engine, though it will be apparent, after reading the following description, that certain features of the invention could be readily used in connection with a single acting engine. It should, therefore, be understood that the principles disclosed in this invention are not limited in their application to a double acting engine, except in so far as specific limitations may appear in the appended claims.

Referring to the drawings, 10 designates a cylinder having its ends closed with heads 11 and 12, and provided with a water jacket 13 which communicates with similar water spaces in each of the heads 11 and 12. A piston, designated by the numeral 14 is slidably fitted in the cylinder 10, and provides a partition which forms working chambers 15 and 16, respectively, between opposite ends of the piston 14 and the cylinder heads 11 and 12. The working chamber 15 is provided with an inlet port which consists of a central opening 17 in the head 11, which communicates through a passage 17ª in the head with a fuel intake manifold 18. The inlet port 17 is closed by a puppet valve 19 which is normally held against its seat by means of a coiled spring 20 surrounding the stem 21 and interposed between the cylinder head 11 and a washer 22 on the outer end of the valve stem 21. For the purpose of preventing leakage of fuel around the valve stem 21, the stem is inclosed in a suitable housing 23 having a threaded engagement with the cylinder head 11. The fuel intake manifold 18 preferably extends the full length of the cylinder 10 and communicates at the inner end of the cylinder with a passage 24 in the cylinder head 12. This passage opens into the working chamber 16 through an inlet port 25 arranged to one side of the center of the cylinder head 12. A puppet valve 26, similar in construction to the valve 19, closes the inlet port 25 and is held against its seat by means of a coiled spring 27 surrounding the valve stem and inclosed in a housing 28, substantially the same as above described in connection with the inlet valve 19 for the working chamber 15. The valves 19 and 26 preferably open inwardly toward the piston 14, and their conical surfaces, when the valves are open, assist in directing the incoming charge of explosive mixture toward the side walls of the working chamber, and in this way prevent any appreciable amount of the spent products of combustion from being entrapped in the corners of the working chambers 15 and 16. The wall of cylinder 10 adjacent the inner end of the working chamber 16 is formed with a pocket 29 which partially surrounds the inlet port 25 and is formed with a curvature which has a tendency to direct the incoming charge entering the working chamber 16 across the working chamber, so as to force the products of combustion on the opposite side of the working chamber toward the exhaust port. It will be obvious that each cylinder head, if desired, could be provided with a plurality of inlet valves, if such a structure should be deemed necessary to entirely prevent the spent products of combustion from being entrapped. 30 designates an exhaust port which is preferably opened and closed by the reciprocal movement of the piston 14 so that the port will communicate alternately with the working chambers 15 and 16. The piston 14 in its preferred construction, consists of heads 31 and 32 formed with annular channels 33 and secured on the piston rod 34, so that the rims 35 of the piston heads stand a short distance apart near the center of the piston, as indicated at 36. This construction permits the piston to be made light in weight and also permits the rims 35 to expand and contract freely without danger of warping. The piston rod 34 extends through a gland 37 formed on the cylinder head 12, and is provided with an enlarged portion 38 which operates in a central bore 39 of said gland and is formed with grooves 40 in which packing rings 41 are inserted. These packing rings are adapted to expand outwardly against the walls 39 so as to provide a connection between the piston rod and gland which will be sufficiently tight to prevent the compression in the working chamber 16 from escaping, and at the same time minimize the friction on the piston rod.

The inner end of the piston rod is connected to a cross head 42 which in turn is connected by means of a pitman 43 to a crank 44 of a power shaft 45. 46, 46 designate balance wheels secured on opposite ends of the power shaft 45.

The explosive mixture for the working chambers 15 and 16 is produced and forced into said chambers under pressure by means of the following mechanism, which considered generally, consists of a closed carbureter 47, a fuel supply reservoir 48 adapted to supply a liquid fuel to the carbureter, and an air compressor 49ª which provides the necessary air pressure for vaporizing said fuel and for forcing the mixture into the working chamber.

Figure 7:
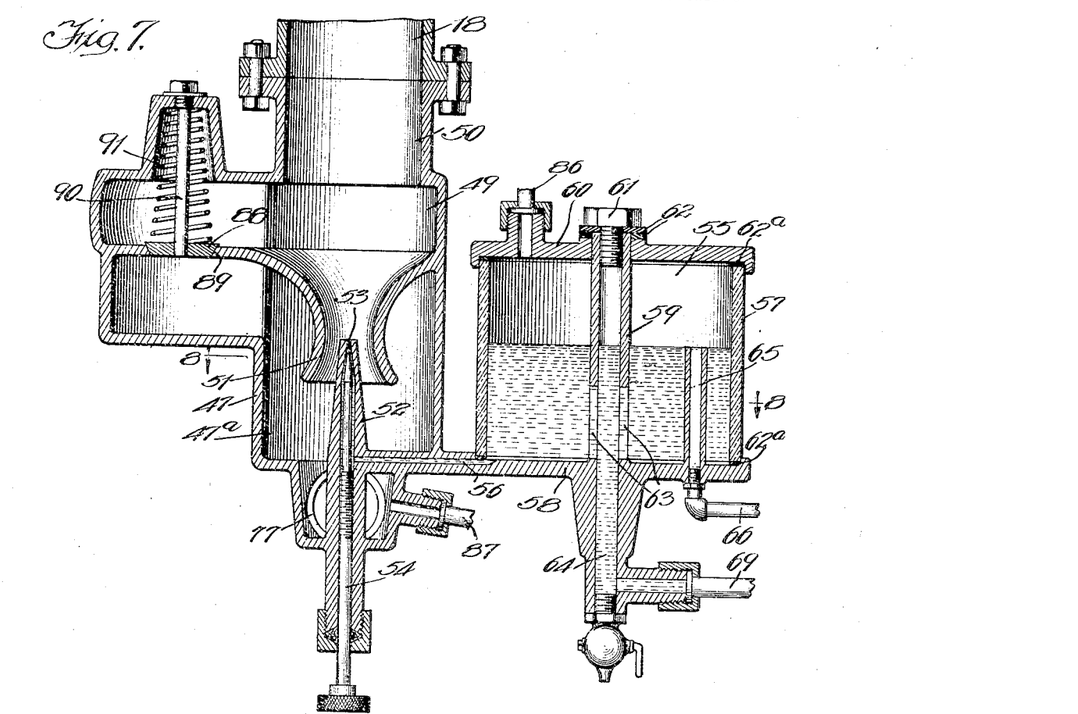
Fig. 7 is a vertical sectional view illustrating the internal construction of the preferred form of carbureter forming a part of the invention.
Figure 8:
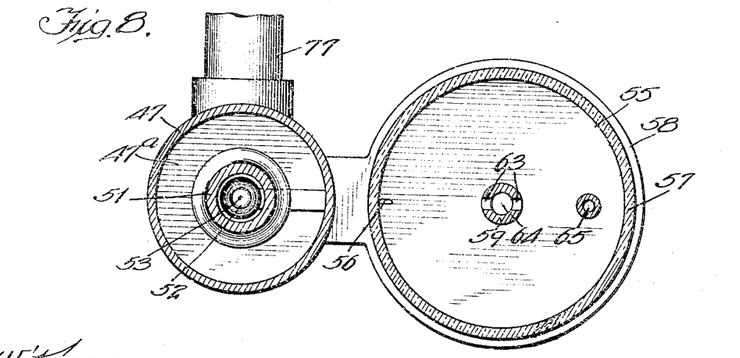
Fig. 8 is a sectional plan taken on line 8—8 of Fig. 7.
Figure 9:
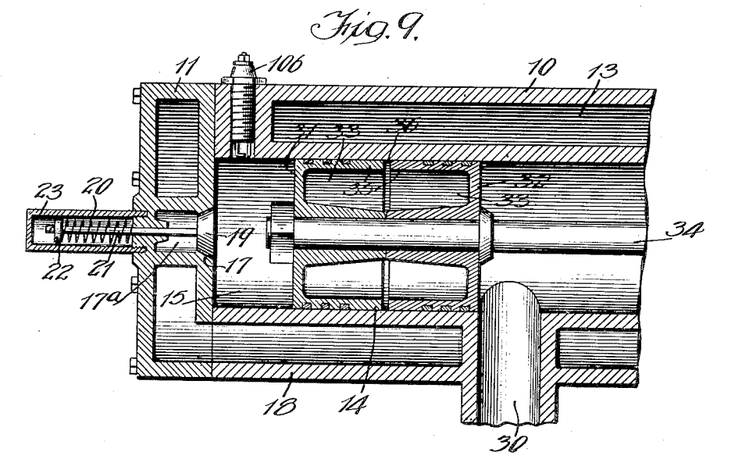
Fig. 9 is a fragmentary view in section of a portion of the engine cylinder, and illustrating the preferred construction of piston.
Figure 10:
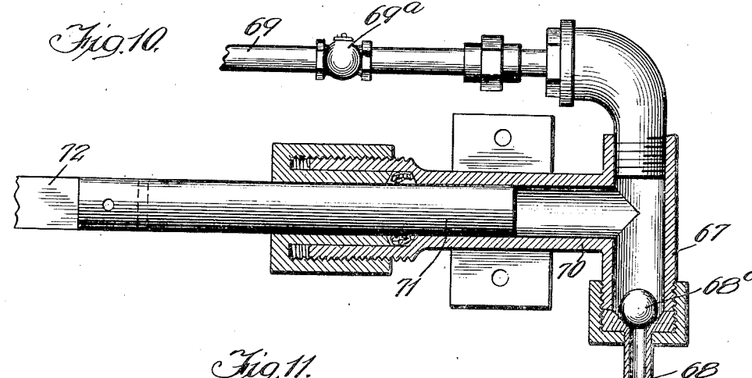
Fig. 10 is a vertical section of a fuel pump employed in the preferred embodiment of the invention.
Figure 11:
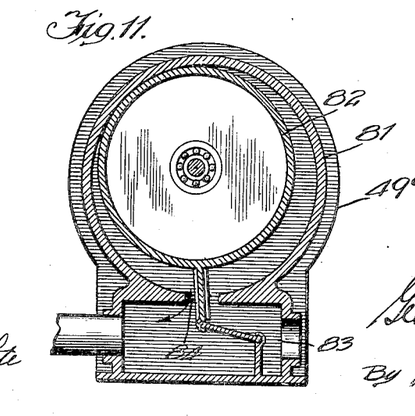
Fig. 11 illustrates the preferred form of air compressor for supplying air to the carbureter.
Figure 12:
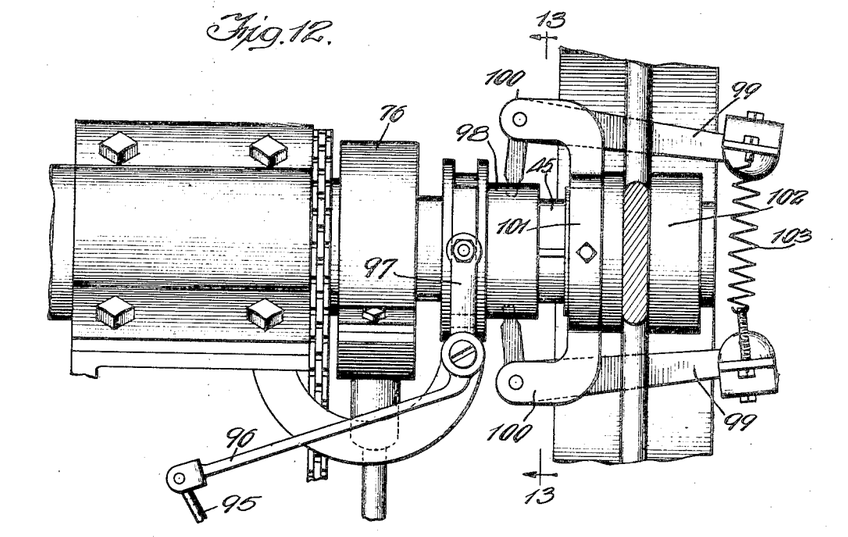
Fig. 12 is a fragmentary plan view illustrating the preferred construction of a controlling mechanism.
Figure 13:
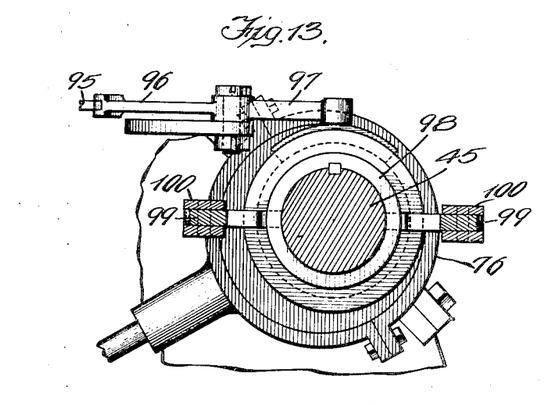
Fig. 13 is a sectional view taken on line 13—13 of Fig. 12.

The carbureter (Figs. 7 and 8) preferably consists of a casing formed with an air chamber 47ª and a mixing chamber 49 which communicates, through a passage 50, with the inlet manifold 18 of the engine. The air and mixing chambers are separated by a downwardly curved partition forming a Venturi tube 51. A fuel nozzle 52 extends into the contracted passage of the Venturi tube, and is provided with a fuel discharging port 53 which is controlled by a needle valve 54. The fuel nozzle 52 communicates with a fuel supply chamber 55 by means of a duct 56 which leads into the bottom of said supply chamber. The supply chamber preferably consists of a glass cylinder 57 suitably supported on the base 58 which is formed at the center with a vertically extending tubular portion 59. Cap 60 fits over the upper edge of the cylinder 57 and is clamped in place by means of a screw bolt 61 having a threaded engagement with the upper end of the tubular portion 59 of the base. Gaskets 62 of suitable material are interposed between the under side of the head of the bolt 61 and the cap 60 so as to provide an air tight connection at this point. Suitable gaskets 62ª may likewise be interposed between the upper and lower edges of the glass cylinder 57 and the cap 60 and base 58. 63 designates transverse slots in the tubular portion 59 through which the fuel feed passage 64 communicates with the interior of the fuel chamber 55. The liquid fuel is maintained at a level in the supply chamber 55 at substantially the same height as the port 53 of the feed nozzle 52 by means of an overflow duct 65. This overflow duct is connected by means of an overflow pipe 66 with the supply reservoir 48, and is adapted to return all of the surplus fuel, introduced into the supply chamber, back into the fuel supply reservoir. 67 designates a fuel pump which is operated to withdraw fuel from the supply reservoir 48 through a duct 68 and force it through the ducts 69 and 64 into the supply chamber 55. This pump preferably comprises a T-shaped casing 70 and a piston 71, the latter of which is operatively connected by means of a connecting rod 72 with an eccentric rod 73. The outer end of the eccentric rod 73 is secured to the lever 74 of a lubricating pump mechanism designated at 75, the inner end being connected to an eccentric 76 (Figs. 12 and 13) secured to the power shaft 45. Suitable check valves 68ª and 69ª are interposed in the fuel ducts 68, 69, to prevent a back pressure in the supply reservoir 48. The air chamber 47ª of the carbureter is connected with an air supply duct 77 leading into an air reservoir 78, which is supplied with air by means of the air compressor 49, the compressor being operated by means of a link belt connection 79 with a sprocket 80 secured to the power shaft 45. The air compressor, it will be understood, may be of any suitable construction, though I preferably employ the type illustrated in Fig. 11 of the drawings, as consisting of an annular casing 81 and an annular rotor 82, which operates to draw air into the casing through the inlet 83 and force it out through the discharge port 84 into the air reservoir 78. 85 designates a relief valve, which may be of any well known construction, arranged at one end of the air reservoir 78, and adapted to prevent the pressure in the said reservoir from exceeding a predetermined pressure.

86 designates a pressure equalizing duct leading from the mixing chamber 49 into the supply chamber 55 at a point above the fuel therein, so as to equalize the pressure in these chambers. A similar pressure equalizing duct 87 leads from the air chamber 47ª to the fuel supply reservoir 48. These pressure equalizing ducts 86 and 87 provide suitable means for maintaining an equal pressure in the mixing and fuel supply chambers of the carbureter and in the fuel supply reservoir 48.

Under certain conditions it is desirable to supply a lean mixture to the working chambers, such, for example, as when the engine is operating at high speed. In carrying out this principle of operation, the carbureter is preferably provided with an auxiliary air valve designated at 88, which closes an auxiliary air port 89 in the partition between the air chamber 47ª and the mixing chamber 49. The valve is preferably slidably mounted on a stationary stem 90 and is normally held against its seat by means of a coiled spring 91.

*Controlling mechanism.*—The air pressure in the carbureter, fuel supply chamber and fuel supply reservoir, is controlled by means of a controlling valve designated at 92, which is preferably interposed between the carbureter and the air supply reservoir 78, so that the air, after being impregnated with the vapor of the liquid fuel, will have an unobstructed path to the working chambers. This valve operates in a casing 93, which is provided with a plurality of openings 94 adapted to be opened and closed by the movement of the valve 92. The valve 92 is connected by means of a connecting link 95 to a bell crank 96, the short arm 97 of which is operatively associated with a sleeve 98 which forms a part of the controlling mechanism.

This sleeve is splined on the power shaft 45 so as to be moved axially thereon by means of weighted bell cranks 99, 99, pivotally supported in bifurcated ends 100 of a bracket 101 rigidly secured to the hub 102 of one of the balance wheels 46. The weighted outer ends of the bell cranks 99, 99, are held in their normal position by means of tension springs 103 and are adapted to be forced outwardly by the centrifugal force incident to the rotation of the balance wheel to which they are connected.

Figure 16:
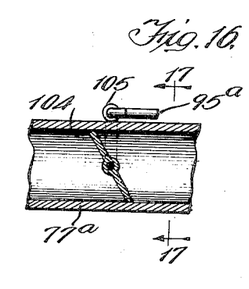
Fig. 16 is a longitudinal sectional view of the air duct illustrating a modified form of controlling valve.
Figure 17:
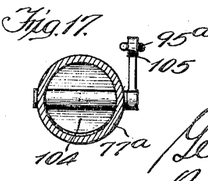
Fig. 17 is a section taken on line 17—17 of Fig. 16.

In Fig. 16 I have shown a modified form of controlling valve, which, in this case, consists of a butterfly valve 104 which is operatively arranged across the air duct 77$^a$ between the carbureter and air reservoir 78. This valve may be operatively connected with the above described controlling mechanism by means of the connecting rod 95$^a$ which is shown as connected to the lever 105 of the valve 104.

*Operation.*—The liquid fuel is pumped from the fuel supply reservoir 48 to the fuel supply chamber 55 and is maintained at a level in said chamber substantially equal to the height of the fuel nozzle 52. Any surplus oil is returned through the overflow duct 65 to the supply reservoir. This returning of the surplus fuel to the supply reservoir is facilitated by arranging the supply reservoir at a level below the overflow of the supply chamber, and by equalizing the pressure in the said supply chamber and reservoir. The pressure gage 48$^b$ indicates the pressure in the fuel reservoir and also the pressure in the fuel supply and mixing chambers of the carbureter. An equal pressure in the mixing and supply chambers is maintained, thus insuring a steady flow of fuel through the fuel port when the engine is operating. To start the engine, the power shaft is rotated. This imparts motion to the air compressor which forces air at a low pressure up through the Venturi tube 51. This air, being forced through the Venturi tube around the fuel feed port 53, draws a sufficient amount of fuel with it to provide a rich mixture. As soon as the pressure in the inlet manifold is raised to a predetermined pressure above the pressure in either of the working chambers, the inlet valve for such chamber will be forced open against the tension of the spring, which normally holds it in its closed position, and the working chamber filled with a fresh charge.

Figure 1:
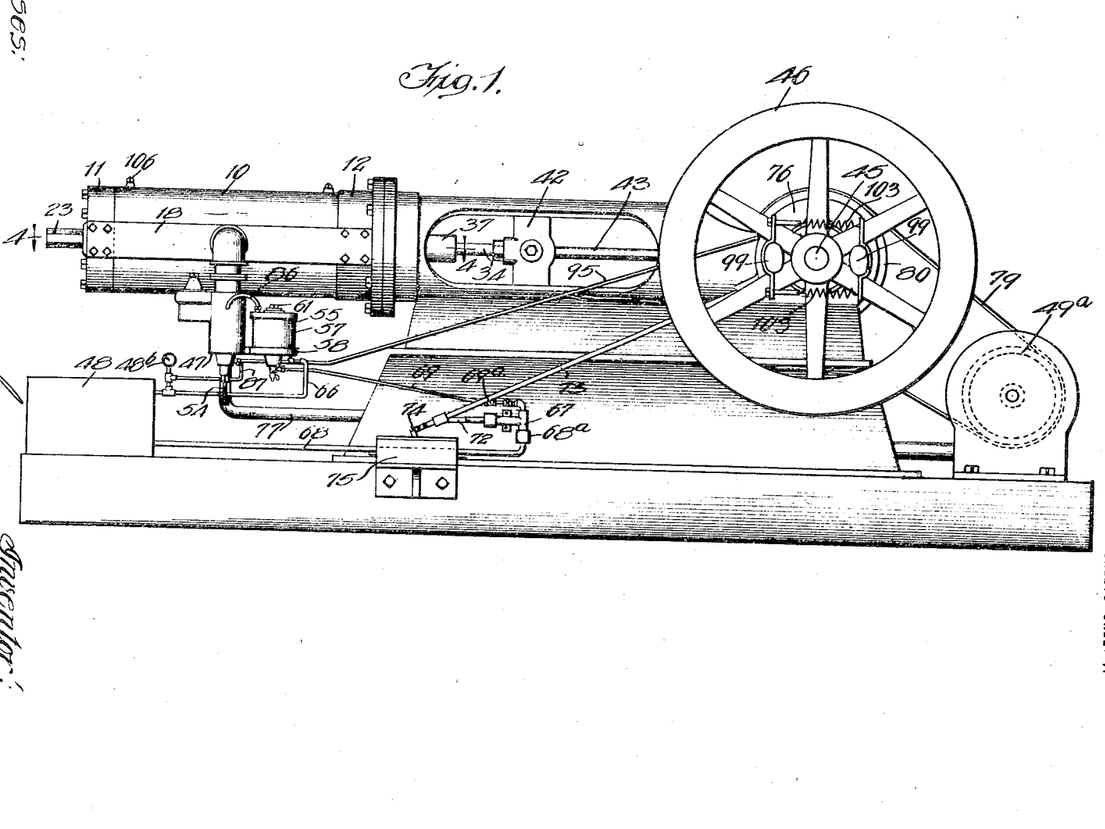
Figure 1 is a side view in elevation of an engine constructed in accordance with the invention.
Figure 2:
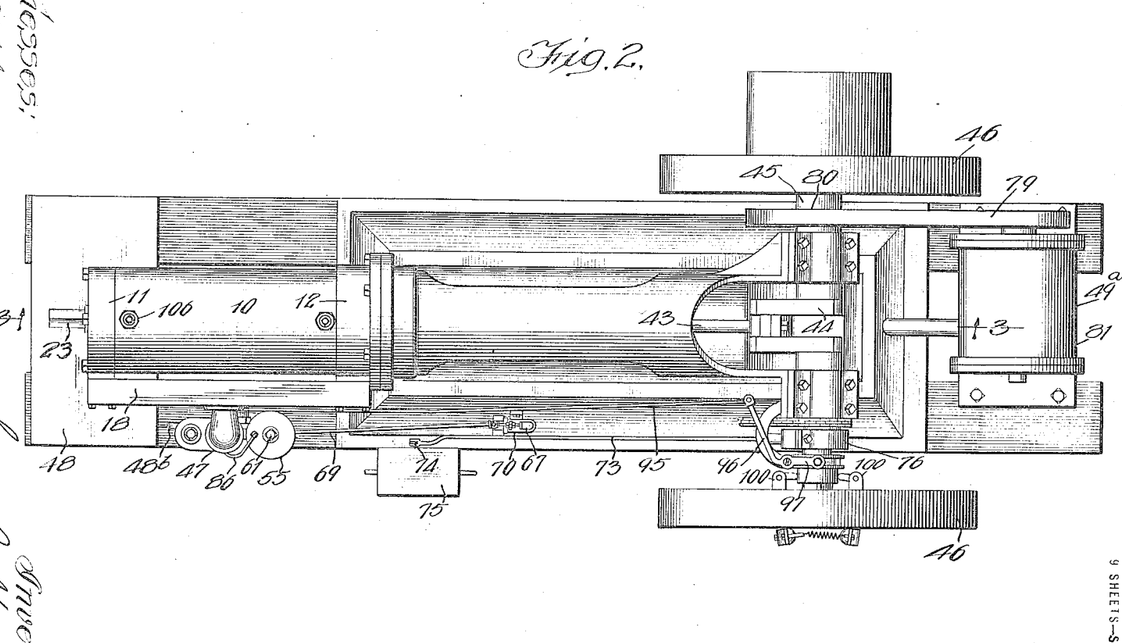
Fig. 2 is a plan view of the same.
Figure 3:
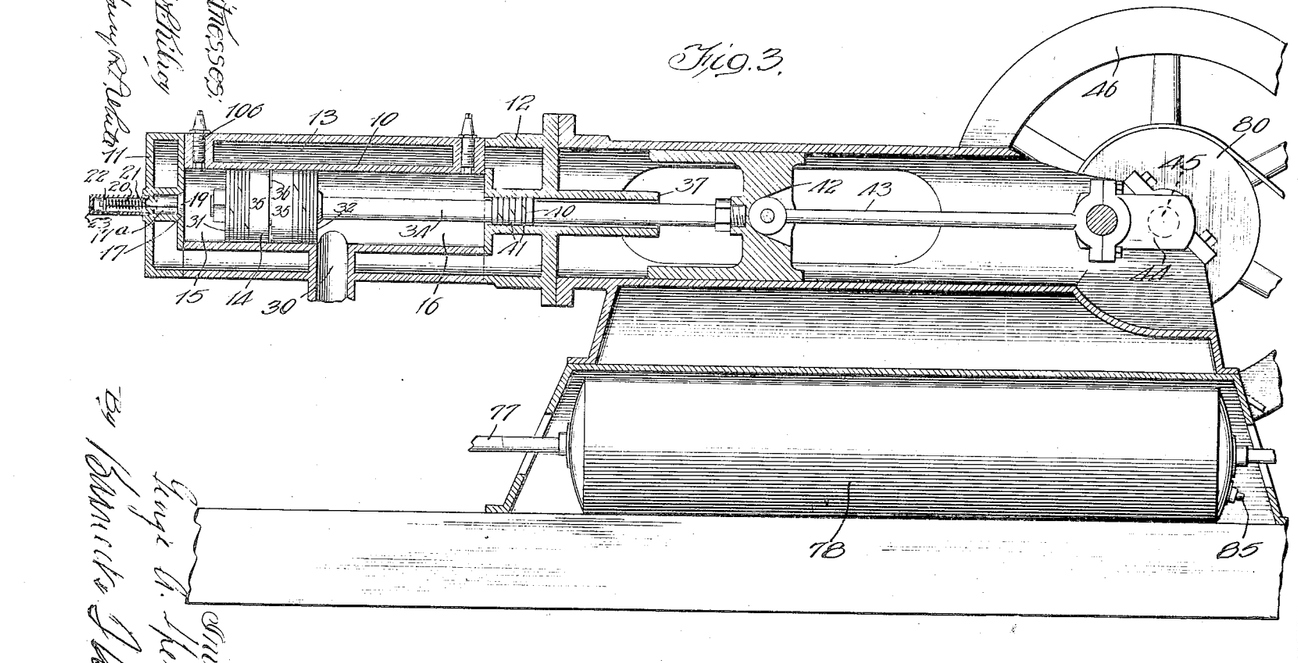
Fig. 3 is a longitudinal sectional view taken on line 3—3 of Fig. 2, looking in the direction indicated by the arrows.
Figures 4, 5, 6:
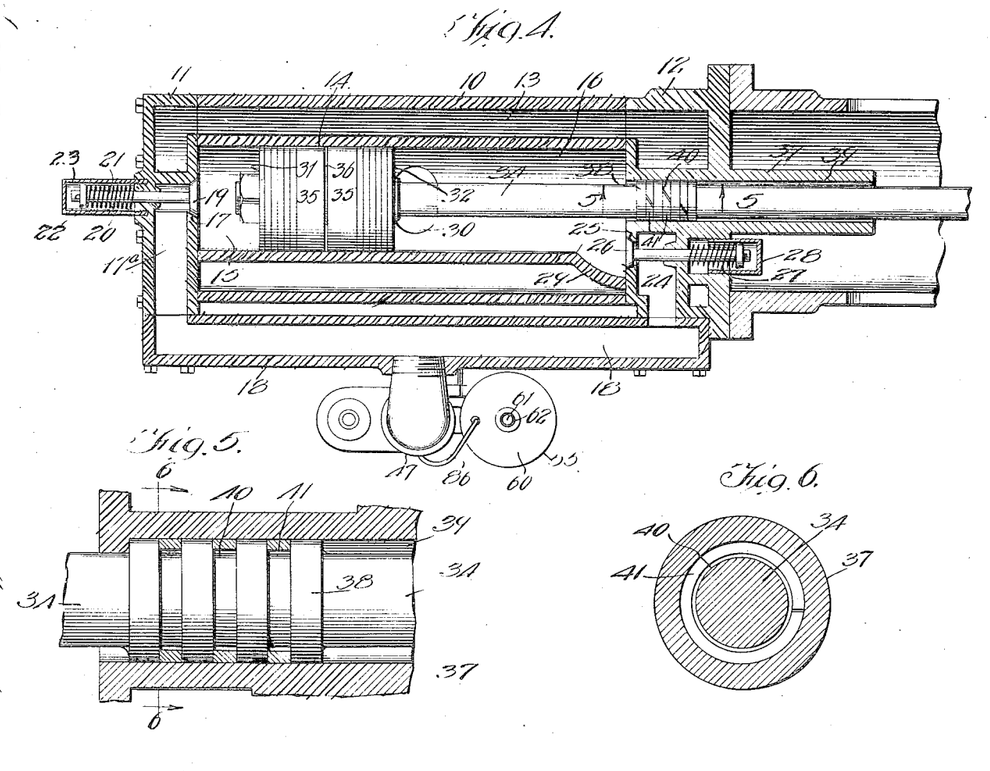
Fig. 4 is an enlarged plan section taken through the working chambers on line 4—4 of Fig. 1.
Fig. 5 is a fragmentary sectional view of a further enlargement of the piston rod and packing gland, taken on line 5—5 of Fig. 4.
Fig. 6 is a cross sectional view taken on line 6—6 of Fig. 5.
Figure 14:
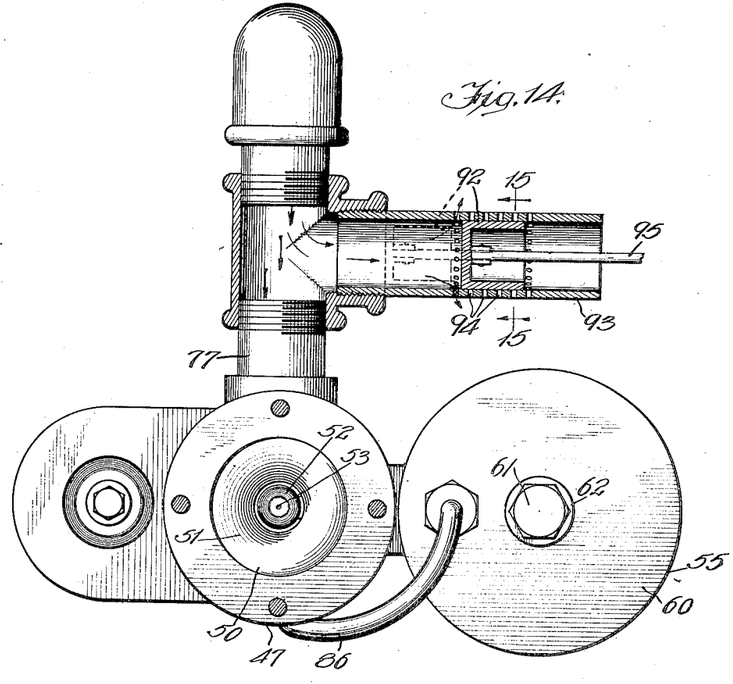
Fig. 14 is a plan view partly in section, illustrating the preferred form of valve for controlling the air pressure admitted to the carbureter, and showing the connection of said valve to the controlling mechanism illustrated in Figs. 12 and 13.
Figure 15:
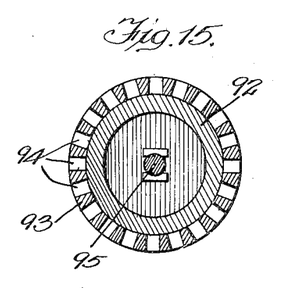
Fig. 15 is a cross section taken on line 15—15 of Fig. 14.

Referring, for example, to Figs. 3 and 4, the piston 14 is shown in these figures at substantially the firing position. Assuming that the chamber 15 is filled with a compressed charge ready to be ignited by a spark from the spark plug 106. The expansion of the igniting gases will force the piston 14 inwardly until it uncovers the exhaust port 30. As soon as the pressure is reduced to a point below the incoming fresh charge, the pressure of the fresh charge will unseat the inlet valve 19 and rush into the working chamber 15, so as to entirely fill the same and force out the remaining portion of the spent products of the previous explosion. The exhaust port 30 is so proportioned with respect to the stroke of the piston that the port is closed by the return stroke of the piston immediately after the entire spent products of combustion have been exhausted, without permitting the escape of any of the incoming fresh charge. As the engine increases its speed, the air pressure in the air supply reservoir 78 increases until the said pressure reaches a predetermined point. Any excessive air pressure above the predetermined point will open the relief valve 85, so as to maintain a fixed safety pressure, for example, six pounds, in the air reservoir, mixing and fuel supply chambers, of the carbureter and in the fuel supply reservoir. When the engine is started the controlling valve 92 will stand in a position such as indicated in dotted lines in Fig. 14 to close the openings 94 in the casing, so as to direct all of the air generated through the carbureter until the balance wheels of the engine have attained a normal operating speed. At this time, the weighted bell cranks 99 on the hub 102 of the balance wheel 46 will have moved outwardly, by centrifugal force, a distance sufficient to rock the bell crank 96 and move the valve 92 to a position which will uncover certain of the ports 94 in the valve casing and permit a portion of the air in the air reservoir 78 to escape to the atmosphere, thus maintaining the air pressure at the proper pressure to insure a mixture of air and fuel most suitable for the normal operation of the engine. Assuming, for example, that the normal speed of the engine under a certain load is 480 revolutions per minute, and that the air pressure desired for the explosive mixture under such conditions is less than the pressure at which the relief valve 85 will open. The controlling valve 92 under such conditions will be held in substantially the position shown in full lines in Fig. 14, so as to maintain an air pressure below the maximum in the reservoir. By this means of controlling the operation of the engine, the difference in the power necessary to operate the air compressor against the operating pressure desired in the air reservoir under such conditions and that of the maximum pressure of said air reservoir may be applied to another load. When the engine is operating with a light load its speed will increase to the maximum revolutions per minute and the air pressure will increase until it reaches the point at which the relief valve 85 will open. As the speed of the engine increases from the normal to the maximum revolutions the increase in the air pressure will unseat the auxiliary air valve 88 of the carbureter so as to increase the proportion of air to gasolene in the fuel mixture.

In the modification illustrated in Fig. 18, an arrangement is shown which is suitable for using kerosene as a fuel. In this arrangement, the feed pipe 110 is coiled within the exhaust pipe 111 of the engine, as indicated at 112. With this arrangement, the kerosene withdrawn from the kerosene supply reservoir 113 will be forced through the coil 112 and heated to substantially the boiling point before it is introduced into the fuel supply chamber 114 of the carbureter. 115 designates a nozzle through which a jet of steam is introduced into the manifold and mixed with the vaporized mixture of kerosene and air. In other respects the structure may be substantially the same as that described in connection with Figs. 1 to 17, inclusive, and need not be again described in detail.

While I have described my invention in specific embodiments, it will be obvious that modifications in structure might be made without departure from the spirit of my invention. It will, therefore, be understood that my invention contemplates all such modifications that may be made within the scope of the appended claims

I claim:

1. In an internal combustion engine, the combination with a working chamber, of means for supplying a mixture of air and fuel to the working chamber comprising a closed carbureter having a mixing chamber, a fuel port opening into the mixing chamber, means for supplying compressed air to said mixing chamber, whereby a constant pressure above atmospheric is maintained therein, a closed fuel chamber, means for equalizing the pressure in the mixing and fuel chambers, means for supplying fuel to the fuel chamber and maintaining a substantially constant level of fuel therein comprising a closed fuel supply reservoir, a fuel pump for withdrawing fuel from the supply reservoir and introducing it into the fuel chamber, an overflow duct leading from said fuel chamber to said supply reservoir, and means for equalizing the pressure in said fuel chamber and supply reservoir 2. In an internal combustion engine, the combination with a working chamber, of means for supplying a mixture of air and fuel to the working chamber comprising a closed carbureter having a mixing chamber, a fuel port opening into the mixing chamber, means for supplying compressed air to said mixing chamber, governing mechanism for varying the pressure of air in said mixing chamber, a closed fuel chamber, means for equalizing the pressure in the mixing and fuel chambers, means for supplying fuel to the fuel chamber and maintaining a substantially constant level of fuel therein comprising a closed fuel supply reservoir, a fuel pump for withdrawing fuel from the supply reservoir and introducing it into the fuel chamber, an overflow duct leading from said fuel chamber to said supply reservoir, and means for equalizing the pressure in said fuel chamber and supply reservoir.

3. In an internal combustion engine, the combination with a working chamber, of means for supplying a mixture of air and fuel to the working chamber comprising a closed carbureter having a mixing chamber, a fuel port opening into the mixing chamber, means for supplying compressed air to said mixing chamber, governing mechanism for varying the pressure of air in said mixing chamber, an auxiliary air valve to automatically increase the proportion of air in said mixture, a closed fuel chamber, means for equalizing the pressure in the mixing and fuel chambers, means for supplying fuel to the fuel chamber and maintaining a substantially constant level of fuel therein comprising a closed fuel supply reservoir, a fuel pump for withdrawing fuel from the supply reservoir and introducing it into the fuel chamber, an overflow duct leading from said fuel chamber to said supply reservoir, and means for equalizing the pressure in said fuel chamber and supply reservoir.

4. In a two cycle internal combustion engine, the combination with a working chamber having an inlet port adjacent the end of the compression stroke of the piston and exhaust ports adjacent the end of the working stroke, of means for introducing a mixture of air and fuel into said chamber under pressure comprising a carbureter having a closed mixing chamber, means for supplying compressed air to said mixing chamber, whereby a constant pressure above atmospheric is maintained therein, a closed fuel chamber, a duct leading from said mixing chamber to the fuel chamber to equalize the pressure in said chambers, means for supplying fuel to the fuel chamber and maintaining a substantially constant level of fuel therein comprising a closed fuel supply reservoir, a pump for withdrawing fuel from said reservoir and introducing it into said fuel chamber, an overflow in said fuel chamber adapted to return any surplus fuel to the supply reservoir, and means for maintaining a pressure in said reservoir equal to the pressure maintained in the mixing chamber GEORGE A. SPELTS, Jr.